…

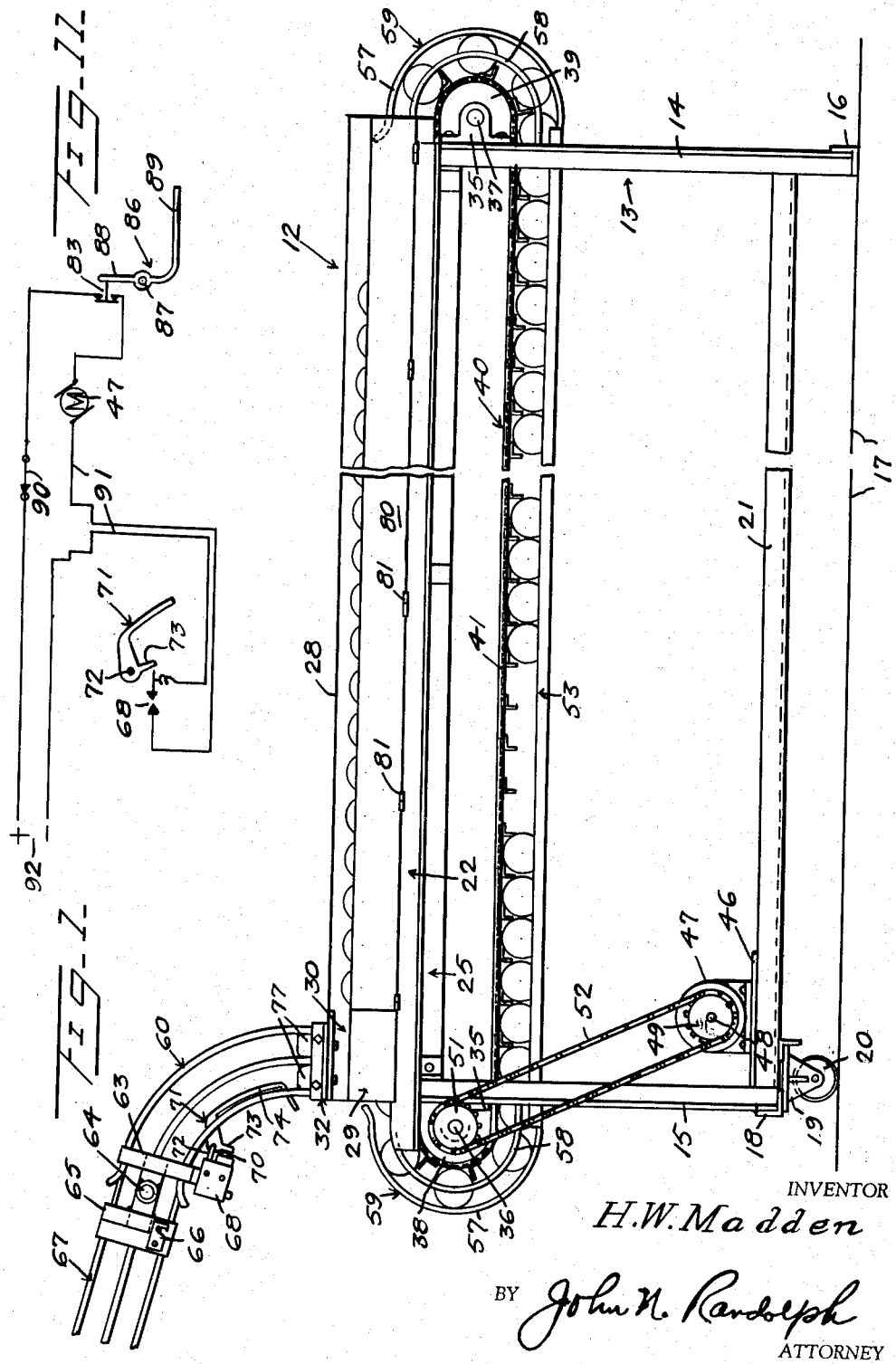

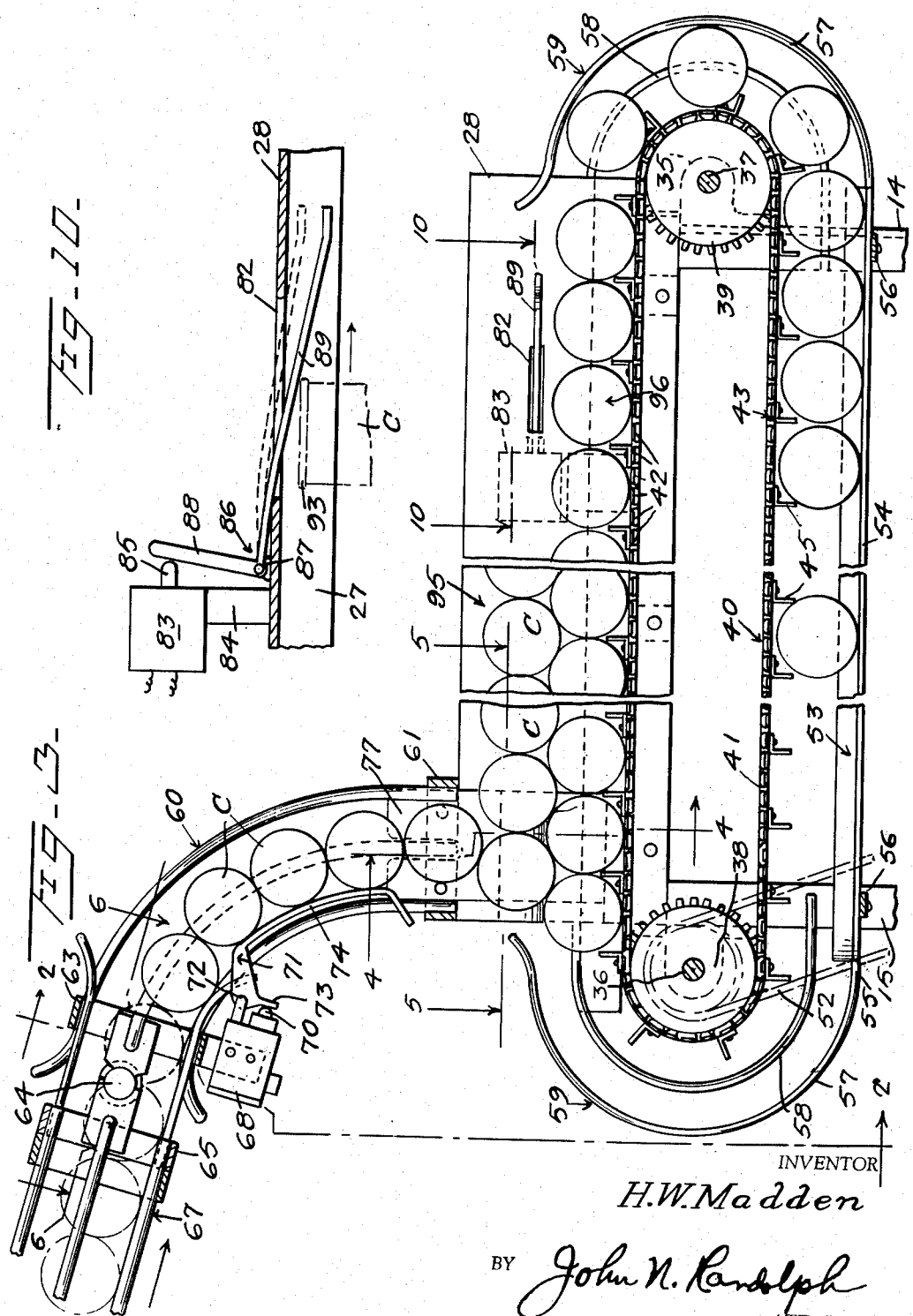

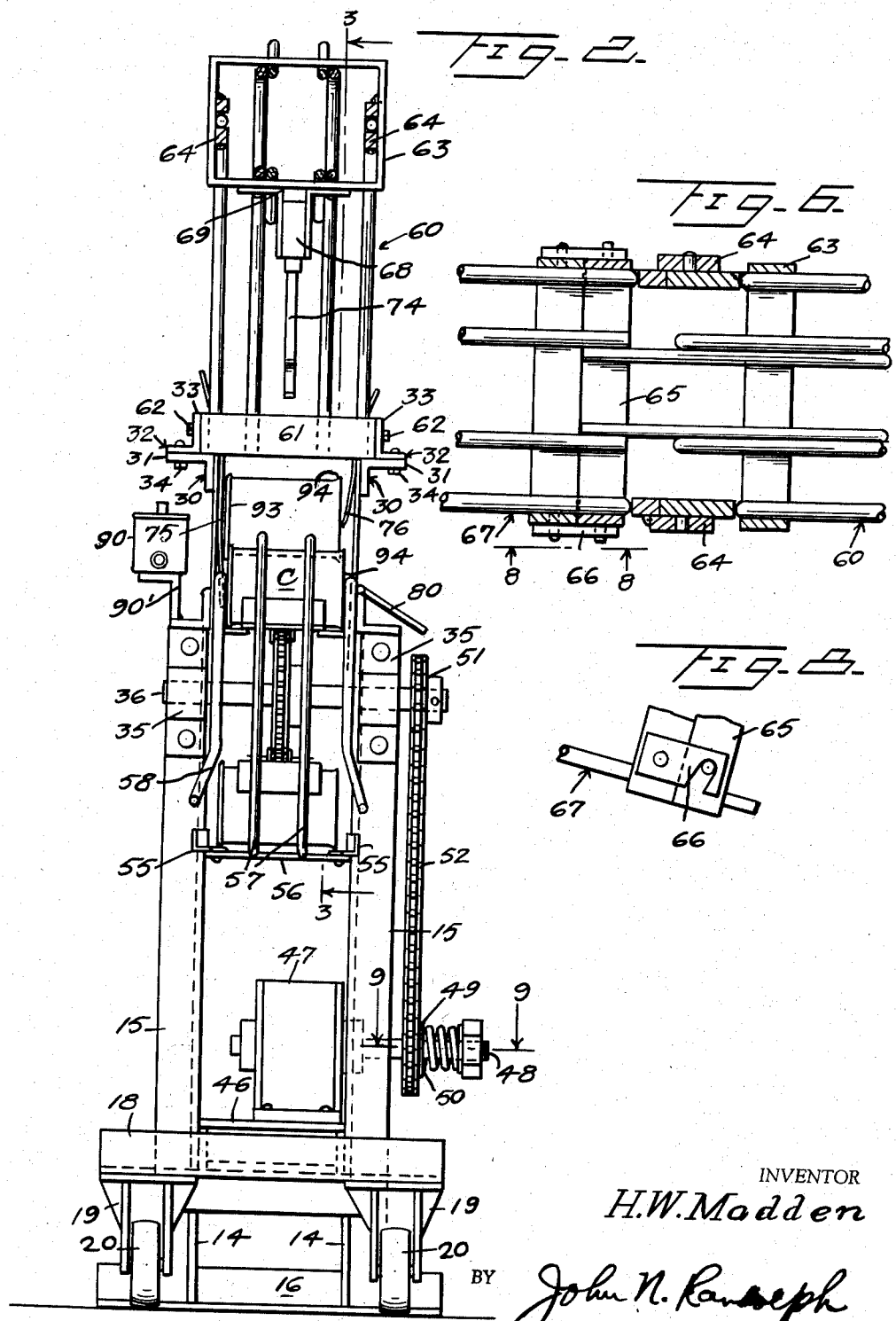

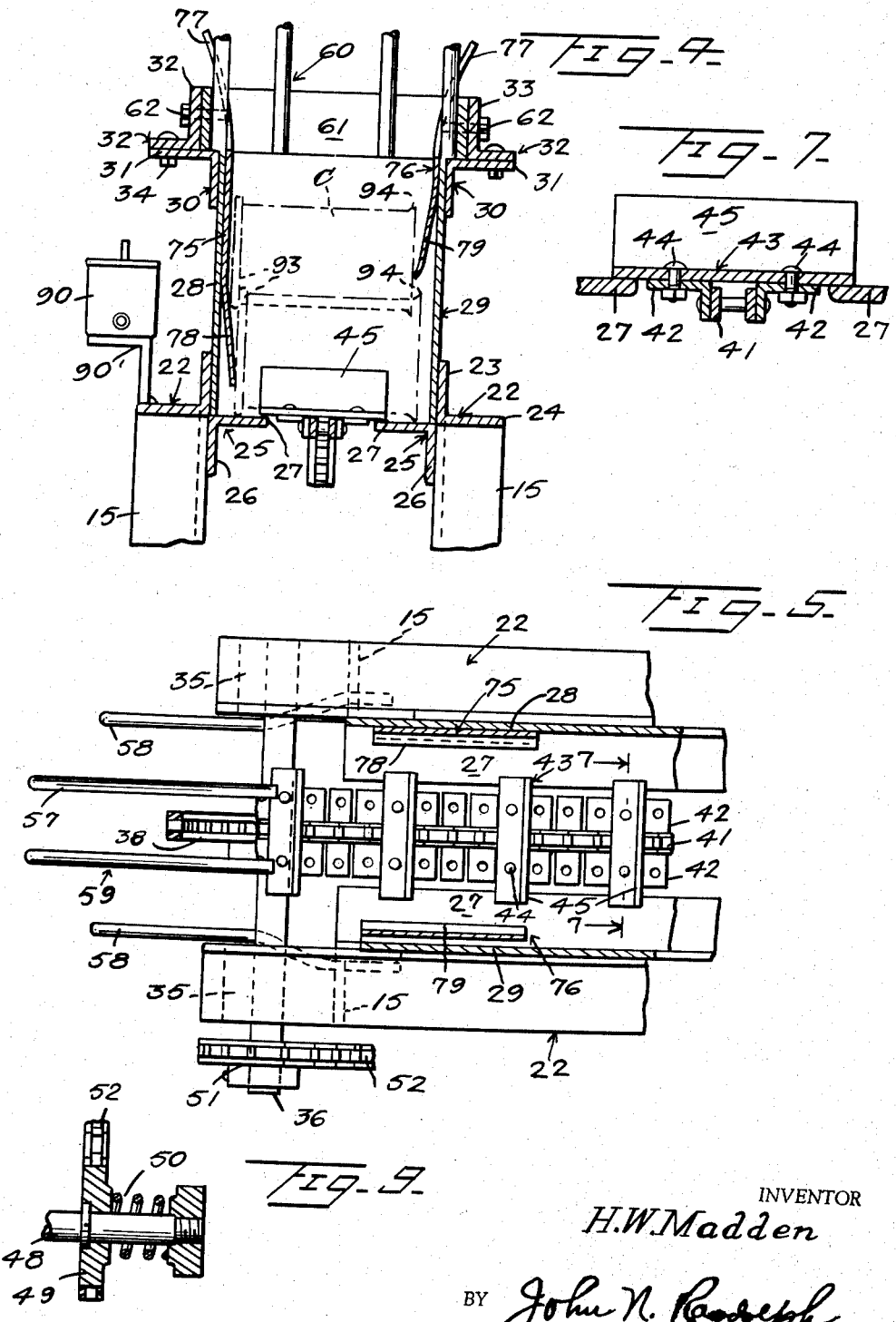

United States Patent Office 2,868,350
Patented Jan. 13, 1959

2,868,350

DOUBLE TIER CAN CONVEYOR

Homer W. Madden, Hanover, Ind.

Application May 21, 1956, Serial No. 586,236

5 Claims. (Cl. 198—35)

This invention relates to a machine for receiving cans by gravity and by which the cans are conveyed in two tiers from the can inlet of the machine, for conveniently arranging the cans to be picked up for stacking by a two tier stacking fork.

More particularly, it is an object of the present invention to provide an automatic machine of extremely simple construction including a power-driven conveyor onto which the cans are discharged from the can inlet of the machine and which is provided with driving means which is automatically started and stopped by the cans entering the machine and by certain of the cans being conveyed along by the machine, respectively.

A further object of the invention is to provide a can conveying machine from which the cans can be removed in either one or two tiers by a stacking fork and by means of which removal of an upper tier only of cans will prevent stoppage of the machine, to facilitate a more rapid loading of the portion of the conveyor of the machine from which the cans are removed by the stacking fork.

A further object of the invention is to provide a can conveying machine including novel deflector means for offsetting the tiers of cans relative to one another for hooking the flanges of the cans of the upper tier behind the flanges of the cans of the lower tier for properly positioning the cans for stacking.

Still another object of the invention is to provide a double tier can conveying machine having adjustable parts for accommodating the machine to cans of different sizes.

A further object of the invention is to provide a machine of the aforedescribed character which is relatively light in weight and readily portable to enable the machine to be moved about and positioned readily accessible to a space in which cans are to be stacked.

Various other objects and advantages of the invention will hereinafter become more fully apparent from the following description of the drawings, illustrating a presently preferred embodiment thereof, and wherein:

Figure 1 is a fragmentary side elevational view of the machine;

Figure 2 is an end elevational view, partly in cross section of the machine, taken substantially along a plane as indicated by the line 2—2 of Figure 3 and on an enlarged scale relative to Figure 1;

Figure 3 is a fragmentary longitudinal sectional view, taken substantially along a plane as indicated by the line 3—3 of Figure 2;

Figure 4 is an enlarged fragmentary cross sectional view of a portion of the machine, taken substantially along a plane as indicated by the line 4—4 of Figure 3;

Figure 5 is an enlarged fragmentary horizontal sectional view, taken substantially along a plane as indicated by the line 5—5 of Figure 3;

Figure 6 is an enlarged fragmentary longitudinal sectional view, taken substantially along a plane as indicated by the line 6—6 of Figure 3;

Figure 7 is an enlarged cross sectional view, taken substantially along a plane as indicated by the line 7—7 of Figure 5;

Figure 8 is a fragmentary side elevational view, taken along the line 8—8 of Figure 6;

Figure 9 is an enlarged horizontal sectional view, taken substantially along a plane as indicated by the line 9—9 of Figure 2;

Figure 10 is an enlarged horizontal sectional view, taken substantially along a plane as indicated by the line 10—10 of Figure 3, and Figure 11 is a diagrammatic view of the electric circuit by which the machine is controlled.

Referring more specifically to the drawings, the double tier can conveying machine in its entirety and comprising the invention is designated generally 12 and includes an elongated frame 13 which is relatively narrow, as seen in Figure 2, with respect to its length and height. The frame 13 includes pairs of supporting legs 14 and 15 at the ends thereof, which are preferably formed of angle iron. A horizontally disposed angle iron member 16 is secured to the lower ends of the legs 14 and forms a foot member which is adapted to rest on a supporting surface 17 of the machine 12. A similar angle iron member 18 is secured to the lower ends of the legs 15 but is disposed above the level of the foot member 16. The forks 19 of a pair of wheels 20 are secured to the underside of the member 18. The bottom portions of the peripheries of the wheels 20 are disposed in the same plane as the underside of the foot member 16 and are adapted to engage the supporting surface 17, as seen in Figure 1. The legs 14 and 15 are connected by a longitudinally extending channel member 21 which constitutes a part of the frame 13 and which is disposed adjacent the level of the lower ends of the legs 15.

As best seen in Figures 2 and 4, the frame 13 also includes a pair of upper angle members 22 which extend longitudinally thereof and which have end portions mounted on and secured to the upper ends of the legs 14 and 15, by which said angle members 22 are supported in traversely spaced apart substantially parallel relation to one another. The angle members 22 each has an inner upwardly extending vertical flange 23 and a lower outwardly extending horizontal flange 24. The frame 13 is also provided with a second pair of upper angle members 25 each of which includes a vertical flange 26 which is secured to the inner sides of the legs 14 and 15 and an inwardly extending top flange 27, which forms a can end supporting rail.

The frame 13 is provided with spaced substantially parallel side walls 28 and 29 which extend from end-to-end of the frame and which have lower portions secured to the adjacent angle members 22 and 25. Short angle members 30 are secured to the outer sides of the upper portions of the walls 28 and 29 at the left-hand ends thereof, as viewed in Figures 1 and 3. The angle members 30 have outwardly extending top flanges 31 on which are supported another pair of angle members 32 having upstanding inner flanges 33 which are spaced outwardly from inner portions of the angle members 30 and from the walls 28 and 29, as best seen in Figure 4. Complementary angle members 30 and 32 are secured together by fastenings 34.

Bearings 35 are secured to the legs 14 and 15 beneath and immediately adjacent the ends of the angle members 22 to provide journals for shafts 36 and 37. The shaft 36 is supported by the bearings 35 which are mounted on the legs 15 and has a sprocket wheel 38 fixed thereto and disposed between said bearings. The shaft 37 is journalled in the bearings 35 supported by the legs 14 and has a sprocket wheel 39 fixed thereto and disposed between said last mentioned bearings. An endless conveyor, designated generally 40, includes an endless chain 41 which is trained over the sprocket wheels 38 and 39. As best seen in Figures 4 and 5, angular attaching members 42 are attached to outer sides of the links of the chain 41 in transverse alignment with respect to one another and extend outwardly from opposite sides of the chain 41. Angular conveying elements 43 are mounted on the outer side of the chain 41 and are secured to transversely aligned attaching elements 42 thereof by fastenings 44 to position the conveying elements 43 in spaced apart relation to one another longitudinally of the chain 41. The conveying elements 43 may be spaced different distances apart to accommodate cans of different sizes by attaching said elements 43 to selected ones of the elements 42 by the fastenings 44. Each conveying element 43 has a wall or side 45 which projects outwardly from the chain 41.

A base member 46 is secured to the frame member 21, adjacent the legs 15, and has a motor 47 secured thereto. The motor through reduction gearing drives a shaft 48 which projects laterally from the frame 13. A sprocket wheel 49 is mounted on the shaft 48 and is connected thereto by a slip clutch 50. A sprocket wheel 51 is fixed to an end portion of the shaft 36 and is connected to the sprocket wheel 49 by an endless chain 52.

Angle members 53 extend longitudinally of the frame 13 and are secured adjacent their ends to complementary legs 14 and 15. The angle members 53 are disposed between the legs 14 and 15 and have inwardly extending bottom flanges forming rails 54. The ends of the angle members 53 which project beyond the legs 14 and 15 are flared outwardly with respect to one another, as seen at 55 in Figure 2. Crossbars 56 extend between the rails 54 and are secured at their ends to the undersides of said rails and are disposed between the legs 14 and 15. Complementary ends of a pair of rods 57 are secured to each crossbar 56. The rods 57 extend outwardly from the crossbars and are curved upwardly and thence inwardly so as to be disposed substantially concentrically around the outer halves of the sprocket wheels 38 and 39. A rod 58 extends outwardly from each leg 14 and 15 and is curved upwardly and inwardly and also defines substantially a half circle. The rods 58 are disposed nearer the axes of the shafts 36 and 37 than the rods 57. The two rods 57 and the two rods 58 thus provided at each end of the frame 13 form a semicircular openwork can guiding channel between complementary ends of the top rails 27 and bottom rails 54 and which can guiding channels are designated generally 59.

The machine 12 includes a curved chute section, designated generally 60, of openwork construction and of rectangular cross section having an outlet end provided with a frame 61 which fits between the flanges 33 and is secured thereto by fastenings 62. The chute section 60 extends upwardly from its outlet end 61 and is curved in a direction away from the end of the machine 12 which is located remote therefrom. The chute section 60 is provided with a frame 63, adjacent its opposite upper end, from the sides of which project sections of knee joints 64. A frame 65, constituting the opposite inlet end of the chute section 60, is pivotally connected to the frame 63 by knee joints 64 for pivotal movement about substantially a horizontal axis. The frame 65 is detachably connected by latches 66 to one end of a chute section 67, only a part of which has been illustrated. The chute section 67 is of the same cross sectional shape and size as the chute section 60, as illustrated in Figure 2, and may be of any desired length and is preferably extensible like the intermediate chute section of my prior Patent No. 2,720,302, entitled Telescopic Can and Package Conveying Chute, which issued October 11, 1955. Furthermore, any desired number of chute sections 67 may be employed for conveying cans any desired distance to the machine 12 and are disposed at an incline downwardly and toward the chute section 60 so that the cans will be fed downwardly by gravity through the chute 67, 60, as illustrated in Figure 3, to the machine 12.

An electric switch 68 is hung beneath the frame 63 by a bracket 69. The switch 68 is provided with a push-button 70. A lever 71 is pivotally connected to the switch 68 by a pivot element 72 and has an end 73 disposed to engage and displace the plunger 70 inwardly. The lever 71 includes a curved arm portion 74 which is disposed within the chute section 60 and extends longitudinally thereof and is located adjacent the bottom side of said chute section.

The fastenings 62 at one side of the frame 61 additionally support a can deflector 75 and the fastenings 62 at the other side of the frame 61 support a can deflector 76, as best seen in Figure 4. The deflectors 75 and 76 have corresponding bifurcated upper ends 77 through which the fastenings 62 extend and in which the heads of said fastenings are countersunk, as seen in Figure 4. The furcations of each of said bifurcated portions 77 straddle a side rod of the chute section 60, as seen in Figures 3 and 4, and are flared outwardly toward their upper ends. The deflector 75 which is located on the inner side of and adjacent the side wall 28 extends downwardly to adjacent the level of the rails 27 and has its lower portion 78 flared inwardly, away from the wall 28. The deflector 76 is located on the inner side of the wall 29 and terminates substantially above the level of the rails 27 and has its lower portion flared inwardly and away from the wall 29. The deflector portion 79 is disposed entirely above the level of the deflector portion 78, as seen in Figure 4. The deflectors 75 and 76, below the frame 61, are of a width as great as or greater than the interior width of the outlet end of the chute section 60 as measured in a direction longitudinally of the machine 12.

The side wall 29 includes an upper hinged section 80 which extends from the end of said wall disposed remote from the chute section 60, to adjacent said chute, and which wall section 80 is swingably mounted by hinges 81 at its bottom edge to swing outwardly and downwardly from its upright position of Figure 1 to its open position, inclined downwardly and outwardly, as seen in Figure 2.

The wall 28, near the end thereof disposed remote from the chute section 60, is provided with an elongated longitudinally extending slot 82, as seen in Figures 3 and 10. An electric switch 83 is supported by means of a bracket 84 on the outer side of the wall 28 and is provided with a slidably disposed plunger 85 by means of which said switch is opened and closed. A lever 86 having two arms is pivotally mounted at its apex on a bracket 87 which is supported on the outer side of the wall 28. One arm 88 of the lever 86 extends outwardly from the bracket 87 and bears against the outer end of the plunger 85. The other longer arm 89 of the lever 86 extends through the slot 82 in a direction away from the chute 60 and has a free end portion normally spaced from the inner side of said wall 28, as seen in Figure 10.

A manually operated electric switch 90 is conveniently mounted by a bracket 90' on a part of the machine frame 13, as best seen in Figure 2. The switches 68, 83 and 90 together with the motor 47 are electrically connected by wiring 91, which forms an electric circuit with said switches and the motor, to a suitable source of electric current as indicated at 92, so that all of the switches have to be in a circuit closing position in order for electric current to be supplied to the motor 47. The electric circuit is illustrated diagrammatically in Figure 11.

By lifting the end of the machine 12 supported by the legs 14, said machine can be rolled on the wheels 20 to a location adjacent which cans are to be stacked, as for example in a freight car or truck, onto dollies or into cartons or cases. The extensible section or sections 67 will permit such movement of the machine 12 in directions longitudinally of the chute 60, 67 and will permit the machine to be moved back as the stacking of the cans progresses toward the machine. The other end of the chute 60, 67, not shown, may be suitably supported and held immovable in a position to receive cans from any suitable source of supply.

The switch 83 constitutes a normally closed switch and as previously stated, the switch 68 constitutes a normally open switch. When the machine 12 is to be used the switch 90 is manually positioned in a circuit closing position. However, the motor 47 will remain de-energized as the circuit thereof will be interrupted by the normally open switch 68. As cans C are supplied by gravity to the machine through the extensible chute section or sections 67 and the chute section 60, the weight of the cans which engage the arm portion 74 will rock the lever 71 sufficiently to move the switch 68 to a circuit closing position so that the motor 47 will be energized for driving the endless conveyor 40 clockwise as seen in Figures 1 and 3. The cans C intended to be handled by the machine 12 are newly manufactured cans having a double seamed closed end 93 which forms a bead around the can wall, and an opposite flared or flanged open end 94, as best seen in Figures 2 and 4. As the cans C pass downwardly through the chute outlet 61, each can is deflected endwise thereof and crosswise of the machine by the deflector 76 toward the side wall 28. The first can will thereafter clear the deflector portion 79 and will be deflected in the opposite direction by the deflector portion 78 toward the wall 29 as it moves downwardly onto the endless conveyor 40 and the rails 27 and between two of the conveyor elements 43. The next can C will proceed in a like manner to assume a position on the conveyor behind the aforementioned can, as illustrated in Figure 3. The next can which is discharged from the chute outlet 61 will come to rest upon and between the two preceding cans which are supported on the endless conveyor 40 and rails 27 to form a can of the upper tier 95. As seen in Figure 4, the last mentioned can forming a part of the upper tier 95 will be deflected only by the portion 79 of the reflector 76 toward the side wall 28 and will thus be laterally offset from the two preceding cans which are disposed therebeneath and which form parts of the bottom tier 96. This latter offsetting will cause the beads 93 of each can of the upper tier 95 to be hooked behind portions of the beads 93 of the two cans of the lower tier on which the upper tier can rests, as seen in Figures 2 and 4, and so that the flanged or flared open end 94 of the upper tier can will likewise be hooked or engaged behind the flanges 94 of the cans of the lower tier which are disposed therebeneath. The aforedescribed operation will be repeated as the upper flight of the endless conveyor 40 travels from left to right as seen in Figures 1 and 3 for forming two tiers of cans above the upper flight of the conveyor and above the rails 27. As the cans travel from left to right of the machine 12 in two tiers, the ends 93 and 94 of the cans C of the bottom tier slidably engage and are supported by the rails 27 while being pushed from left to right by the upstanding walls 45 which are disposed between the cans of the bottom tier 96. When the machine 12 is thus in use, the side wall section 80 is swung outwardly and downwardly so that a can stacking fork, as disclosed in my copending application Serial No. 586,235, filed May 21, 1956, now Patent No. 2,828,154, may be inserted into the machine over the inner edge of the open wall section 80. The can stacking fork has upper and lower tiers of tines and the tines of the two tiers are staggered relative to one another for insertion into the cans C of the tiers 95 and 96. The cans thus engaged by the fork can be lifted out of the machine and stacked and will be retained with the cans of the upper and lower tiers hooked or inter-engaged as seen in Figures 2 and 4 while supported by the fork and after being stacked, so that the cans cannot slip from the stack, not shown. The removal of the cans with the stacking fork as previously described is accomplished while the machine is in operation and while the cans are being moved from left to right as seen in Figures 1 and 3.

As best seen in Figure 3, the lever arm 89 is disposed above the level of the cans of the lower tier 96. Should a can C of the upper tier 95 advance from left to right beyond the position of the can as seen in Figure 10, the bead 93 of such leading can of the upper tier 95 will contact the arm 89 for swinging said arm toward the wall 28 from its full line to its dotted line position of Figure 10. This will cause the lever arm 88 to swing toward the switch 83 to displace the plunger 85 inwardly to thus move the switch to an "open" position for breaking the electric circuit to the motor 47 to interrupt operation of the endless conveyor 40 until cans, including the can engaging the arm 89, are removed from the machine 12. When this occurs, the switch 83 will return to its normal "closed" position and the arm 89 will be swung back to its full line position of Figure 10. It will also be understood that should the supply of cans to the machine 12 through the chute section 60 cease, and when the arm portion 74 is no longer engaged by a can C, that the pressure on the switch plunger 70 will be relieved permitting the switch 68 to return to its normal "open" position for de-energizing the motor 47 and stopping operation of the conveyor 40.

It will be apparent that in stacking the cans C that it will sometimes be necessary for the stacking fork to support only one tier of cans to be placed at the top of the stack where insufficient room exists for two tiers. When this occurs, the fork tines are inserted only into the cans C of the upper tier 95. Consequently, the machine 12 will continue to operate and cans of the bottom tier 96 will travel under the lever arm 89 and will pass through the guide channel 59 located around the sprocket wheel 39 onto the bottom rails 54 along which the cans will be conveyed in the opposite direction by the conveyor walls 45, as seen in Figure 3. These cans will thereafter travel through the guide channel 59 which is located around the sprocket wheel 38, and thereafter pass under the chute outlet 61. It will be readily apparent that cans being discharged from the outlet 61 will then be utilized to form the upper tier 95, thus speeding up the stacking of the two tiers of cans on the top flight of the endless conveyor 40.

Various modifications and changes are contemplated and may obviously be resorted to, without departing from the function or scope of the invention as hereinafter defined by the appended claims.

I claim as my invention:

1. A can conveying machine comprising an elongated frame, an endless can conveyor mounted for movement in said frame including upper and lower flights disposed to travel longitudinally of the frame, a power source supported by the frame and connected to the endless conveyor for driving the endless conveyor, said machine having a downwardly opening inlet adjacent one end thereof disposed above the upper flight of the endless conveyor and through which cans are adapted to be supplied by gravity onto the upper flight of the endless conveyor to be conveyed thereby toward the other end of the machine, said inlet being disposed crosswise of the machine for discharging the cans crosswise therefrom onto the conveyor, said endless conveyor having outwardly projecting longitudinally spaced conveyor elements between which the cans are received from said can inlet, said conveyor elements being disposed relative to one another in a manner to retain the cans, disposed on the endless conveyor, in closs adjacency to one another, said inlet being disposed above the upper flight of the endless conveyor a distance greater than twice the diameter of the cans for stacking the cans in two tiers on the upper flight of the endless conveyor, and deflector means supported by and extending downwardly from the can inlet for deflecting the cans passing downwardly from said inlet laterally relative to the endless conveyor for causing the cans of the upper tier to be hooked behind the cans of the lower tier.

2. A can conveying machine comprising an elongated frame, an endless can conveyor mounted for movement in said frame including upper and lower flights disposed to travel longitudinally of the frame, a power source supported by the frame and connected to the endless conveyor for driving the endless conveyor, said machine having a downwardly opening inlet adjacent one end thereof disposed above the upper flight of the endless conveyor and through which cans are adapted to be supplied by gravity onto the upper flight of the endless conveyor to be conveyed thereby toward the other end of the machine, said inlet being disposed crosswise of the machine for discharging the cans crosswise therefrom onto the conveyor, said endless conveyor having outwardly projecting longitudinally spaced conveyor elements between which the cans are received from said can inlet, said conveyor elements being disposed relative to one another in a manner to retain the cans, disposed on the endless conveyor, in close adjacency to one another, said inlet being disposed above the upper flight of the endless conveyor a distance greater than twice the diameter of the cans for stacking the cans in two tiers on the upper flight of the endless conveyor, said power source comprising an electric motor, a normally open starting switch forming a part of the electric circuit of the motor, and a switch actuator disposed to be engaged by cans approaching said can inlet for moving said switch actuator to a position for closing the switch, a normally closed stopping switch disposed in said electric circuit, and a switch actuator having a portion disposed in the path of travel of the cans conveyed by the upper flight of the endless conveyor and located remote from the can inlet for automatically interrupting operation of the conveyor, said last mentioned switch actuator being disposed at a level to be engaged only by a can of the upper tier of cans.

3. A can conveying machine comprising an elongated frame, an endless can conveyor mounted for movement in said frame including upper and lower flights disposed to travel longitudinally of the frame, a power source supported by the frame and connected to the endless conveyor for driving the endless conveyor, said machine having a downwardly opening inlet adjacent one end thereof disposed above the upper flight of the endless conveyor and through which cans are adapted to be supplied by gravity onto the upper flight of the endless conveyor to be conveyed thereby toward the other end of the machine, said inlet being disposed crosswise of the machine for discharging the cans crosswise therefrom onto the conveyor, said endless conveyor having outwardly projecting longitudinally spaced conveyor elements between which the cans are received from said can inlet, said conveyor elements being disposed relative to one another in a manner to retain the cans, disposed on the endless conveyor, in close adjacency to one another, said inlet being disposed above the upper flight of the endless conveyor a distance greater than twice the diameter of the cans for stacking the cans in two tiers on the upper flight of the endless conveyor, said frame including top rails disposed in laterally spaced relation to one another and extending longitudinally of the frame, between which the upper flight of the endless conveyor is movably disposed and on which the ends of the cans of the bottom tier are slidably supported, said frame including laterally spaced bottom rails disposed below the bottom flight of the conveyor for cooperation therewith in conveying a single tier of cans in the opposite direction, and arcuate can guiding channels extending substantially concentrically around the end portions of said endless conveyor for conveying a single tier of cans between the upper and lower can supporting rails.

4. A machine as in claim 3, said machine having spaced side walls extending upwardly from said upper rails between which the tiers of cans disposed above the upper flight of the endless conveyor travel, one of said side walls having an elongated hinged upper section swingable outwardly and downwardly to an open position for exposing the open ends of the cans of the upper tier and portions of the open ends of the cans of the lower tier.

5. A can conveying machine as in claim 3, and means disposed in the path of movement of the cans of the upper tier and remote from said inlet and engaged and actuated by a can of the upper tier for interrupting operation of the power source.

References Cited in the file of this patent

UNITED STATES PATENTS

| 1,157,017 | Lowe | Oct. 19, 1915 |
| 1,315,073 | Baker | Sept. 2, 1919 |
| 1,799,106 | Laxo | Mar. 31, 1931 |
| 1,843,453 | Littlefield | Feb. 2, 1932 |
| 1,916,255 | Cabot | July 4, 1933 |
| 2,714,950 | Rubin | Aug. 9, 1955 |
| 2,715,469 | Burt | Aug. 16, 1955 |

FOREIGN PATENTS

| 150,069 | Austria | June 25, 1937 |